US012732213B2

(12) United States Patent
Cailleux et al.

(10) Patent No.: US 12,732,213 B2
(45) Date of Patent: Sep. 8, 2026

(54) DUAL-BAND FILTER FOR AN IFF/ADS-B RECEPTION CHAIN

(71) Applicants: THALES, Meudon (FR); INSTITUT NATIONAL DES SCIENCES APPLIQUEES DE RENNES, Rennes (FR); UNIVERSITE DE RENNES, Rennes (FR); CENTRE NATIONAL DE LA RECHERCHE SCIENTIFIQUE, Paris (FR); CENTRALESUPELEC, Gif sur Yvette (FR); NANTES UNIVERSITE, Nantes (FR)

(72) Inventors: Aymeric Cailleux, Laval (FR); Laure Hogommat-Chabrot, Laval (FR); Erwan Fourn, Rennes (FR)

(73) Assignees: THALES, Meudon (FR); INSTITUT NATIONAL DES SCIENCES APPLIQUEES DE RENNES, Rennes (FR); UNIVERSITE DE RENNES, Rennes (FR); CENTRE NATIONAL DE LA RECHERCHE SCIENTIFIQUE, Paris (FR); CENTRALESUPELEC, Gif sur Yvette (FR); NANTES UNIVERSITE, Nantes (FR)

( * ) Notice: Subject to any disclaimer, the term of this patent is extended or adjusted under 35 U.S.C. 154(b) by 308 days.

(21) Appl. No.: 18/399,464

(22) Filed: Dec. 28, 2023

(65) Prior Publication Data

US 2024/0223222 A1 Jul. 4, 2024

(30) Foreign Application Priority Data

Dec. 29, 2022 (FR) ...................................... 2214618

(51) Int. Cl.
*H04B 1/00* (2006.01)
*H01P 1/203* (2006.01)

(52) U.S. Cl.
CPC ........... *H04B 1/0057* (2013.01); *H01P 1/203* (2013.01)

(58) Field of Classification Search
CPC .......... H04B 1/406; H04B 1/005; H04B 1/48; H04B 1/0057; H04B 1/52; H04B 1/006;
(Continued)

(56) References Cited

U.S. PATENT DOCUMENTS 6,470,173 B1 * 10/2002 Okada .................. H01P 1/2056 333/204
2011/0215960 A1 * 9/2011 Stevens .................... G01S 7/36 455/226.1

(Continued)

OTHER PUBLICATIONS

Wu, et al., “Direct Synthesis of Multiband Bandpass Filters With Generalized Frequency Transformation Methods”, IEEE Transactions on microwave theory and techniques, vol. 69, No. 8, pp. 3820-3831, Aug. 2021.

(Continued)

*Primary Examiner* — Andrea Lindgren Baltzell
*Assistant Examiner* — Tyler J Pereny
(74) *Attorney, Agent, or Firm* — BakerHostetler

(57) ABSTRACT

A dual-band analogue filter that is passing for IFF signals and ADS-B signals in a first and a second frequency band, and to reject signals received outside these bands, implemented using multi-planar technology, and comprising, in succession: a layer comprising an input port and an output port, a layer comprising a ground plane having openings facing the input port and the output port, a layer comprising N band-pass resonators, a layer comprising N band-stop resonators, arranged such that: the band-pass resonators are connected in pairs by coupling, the first and the last band- (Continued)

pass resonator are connected to the input port and the output port by electromagnetic coupling, each band-pass resonator is connected to a band-stop resonator by electromagnetic coupling.

6 Claims, 8 Drawing Sheets

(58) Field of Classification Search
CPC ...... H04B 1/525; H04B 1/1036; H04B 1/109; H04B 1/0071; H04B 1/18; H04B 1/28; H04B 1/40; H04B 3/52; H04B 1/1018; H04B 1/50; H01P 1/20345; H01P 1/213; H01P 1/203; H01P 1/20309; H01P 1/2039; H01P 1/2056; H03H 7/075; H03H 7/1758; H03H 9/542; H03H 9/547; H03H 7/0115; H03H 7/12; H03H 9/6409; H03H 9/6483; H03H 7/1766; H03H 7/1775; H03H 7/425; H03H 7/427; H03H 9/725; H03H 2001/0085; H03H 7/01; H03H 9/605; H03H 9/706; H03H 11/34; G01S 19/32; G01S 19/33; G01S 19/36; G01S 13/78; G01S 13/91; G01S 13/93; G01S 7/4021; G01S 13/765
See application file for complete search history.

(56) References Cited

U.S. PATENT DOCUMENTS

| | | | | |
|---|---|---|---|---|
| 2015/0214594 | A1 | 7/2015 | Zhou et al. | |
| 2019/0391228 | A1* | 12/2019 | Billaud | G01S 7/021 |
| 2024/0223230 | A1 | 7/2024 | Guillou et al. | |

OTHER PUBLICATIONS

Sekar, et al., "A novel compact dual-band half-mode substrate integrated waveguide bandpass filter", 2011 IEEE MTT-S International Microwave Symposium, 2011.

* cited by examiner

DUAL-BAND FILTER FOR AN IFF/ADS-B RECEPTION CHAIN

CROSS-REFERENCE TO RELATED APPLICATIONS

This application claims priority to foreign French patent application No. FR 2214618, filed on Dec. 29, 2022, the disclosure of which is incorporated by reference in its entirety.

FIELD OF THE INVENTION

The invention lies in the field of air traffic control and anti-collision devices for air traffic. It relates more specifically to a dual-band analogue filter that can be used in a reception chain configured to allow simultaneous reception, on distinct frequencies, of IFF (Identification Friend or Foe) interrogations and ADS-B (Automatic Dependent Surveillance-Broadcast) interrogations. The dual-band filter according to the invention has to meet strong volume and third-party signal rejection constraints.

BACKGROUND

IFF is an encrypted aircraft identification system, allowing civilian or military approach radars to recognize cooperating aeroplanes, referred to as "friends", and determine their heading and distance. IFF is also used in flight in military aeroplanes to identify friendly and enemy aeroplanes. IFF interrogations are carried out by ground stations or aircraft on a frequency band, typically of 14 MHz, centred around the 1030 MHz frequency.

ADS-B is a cooperative surveillance system for air traffic control. An aeroplane equipped with ADS-B determines its position using a global navigation satellite system (GNSS) and periodically sends said position to ground stations and other nearby aircraft. The position transmission rate position depends on the phase of the flight. ADS-B transmissions take place on a frequency band, typically of 16 MHz, centred around the 1090 MHz frequency.

Most aircraft, in particular aeroplanes, carry the items of equipment needed to implement these two standards on board, in particular the items of equipment needed to listen to IFF on the 1030 MHz frequency and ADS-B on the 1090 MHz frequency.

These reception items of equipment are subject to strong performance constraints by the DO-260 B or C standard (for ADS-B), the AIMS 03-1000 standard (for IFF), and the ED73 E or F standard (ADS-B). The constraints relate in particular to minimum rejection levels for the reception radio chains. In particular, the rejection levels to be achieved are very high (greater than 60 dB) in the 1053 MHz-1065 MHz band that is located between the reception frequency of IFF and that of ADS-B.

In order to satisfy these strong rejection constraints, aircraft from the prior art generally carry separate items of equipment for IFF and ADS-B on board. These items of equipment have analogue head filters designed to achieve the rejection levels defined by the standards, designed by cascading a large number of band-pass filters of various technologies: ceramic-cavity filters, SAW (Surface Acoustic Wave) filters, BAW (Bulk Acoustic Wave) filters, etc.

Some items of equipment, such as the Thales TSC4000, receive IFF interrogations and ADS-B messages in the same item of equipment. However, these receptions take place on two separate radio chains.

Carrying two distinct reception items of equipment or an item of equipment with two separate reception chains on board an aircraft to carry out the IFF reception and ADS-B reception functions has obvious consequences in terms of volume and weight, which may not be compatible with small aircraft. In addition, the consumption of the items of equipment is not optimum, this being a major drawback for drone-type applications. Lastly, the components of each reception chain are relatively expensive, and the more there are of them, the greater the serial cost.

For this reason, the Applicant filed patent application FR 2214616, relating to a reception chain that makes it possible to continuously receive IFF interrogations around the 1030 MHz frequency and ADS-B transmissions around the 1090 MHz frequency, while at the same time complying with the normative constraints associated with these receptions.

Designing a radio chain allowing the simultaneous reception of IFF and ADS-B signals, with stable filtering in the frequency bands of interest and complying with the normative constraints on the rejection levels of signals outside these bands, proves to be particularly difficult. Although it is possible to design analogue filters that make it possible to achieve the desired rejection levels around one or the other of the IFF or ADS-B frequency bands, designing analogue filters that are simultaneously passing and stable around the two frequencies of interest while at the same time guaranteeing the required rejection levels outside these bands (greater than 60 dB), in particular in the frequency band located between the IFF band and the ADS-B band, requires the use of particularly high-order filters. Such filters are particularly complex and expensive to produce, exhibit in-band ripple problems, and have a large weight and volume.

Implementing a high-order digital filter that is passing and stable on the two frequency bands of interest and has the desired rejection properties is possible in theory. However, such a filter would be positioned in the reception chain after the analogue-to-digital converter, which would therefore not be protected against the high-level emissions occurring in frequency bands close to those of IFF and ADS-B, in particular those occurring in the frequency band located between the two bands of interest. These non-rejected emissions may have the effect of operating the ADC at saturation. In practice, the saturation of the ADC leads to a non-linear distortion that a minima creates a wideband spectral noise, thereby destroying the dynamic range of the receiver, and in the worst case will lead to deterioration thereof.

For these reasons, the invention that is the subject of application FR 2214616 defines a hybrid analogue/digital radio reception chain that makes it possible to simultaneously receive IFF signals and ADS-B signals. FIG. 1 schematically shows the main elements of this reception chain. It comprises an analogue part 101 with:

- an antenna 103 configured to receive on a frequency band comprising the IFF frequency band (band centred around the 1030 MHz frequency) and the ADS-B frequency band (band centred around the 1090 MHz frequency),
- a dual-band filtering device 104 configured to filter the radiofrequency signal acquired on the reception antenna 101, advantageously a dual-band filter that is passing around the frequency bands of IFF signals (centred around 1030 MHz) and ADS-B signals (centred around 1090 MHz) while at the same time rejecting signals outside these bands, in particular those located in the intermediate frequency band, a low-noise amplifier 105 configured to amplify the signal received on the antenna, a mixer 106, configured to mix the amplified signals with a sinusoidal signal so as to transpose the IFF and ADS-B signals to a lower frequency compatible with the operating band of the analogue-to-digital converter (ADC) 107, an analogue-to-digital converter 107.

It also comprises a digital part 102 configured to duplicate (108) the signals digitized by the ADC, and to process the duplicated signals respectively via a processing path 110 for receiving IFF signals and via a processing path 120 for receiving ADS-B signals.

The IFF path 110 comprises a digital filter 111 and an I/Q demodulator 112 that are configured to reject signals around the IFF signal and transpose the IFF signal to baseband. The positions of the digital filter 111 and of the demodulator 112 may be swapped. It then comprises processing means 113 for processing the demodulated samples, configured to decode the IFF signals.

The ADS-B path 120 comprises a digital filter 121 and an I/Q demodulator 122 that are configured to reject signals around the ADS-B signal and transpose the ADS-B signal to baseband. The positions of the digital filter 121 and of the demodulator 122 may be swapped. It then comprises processing means 123 for processing the demodulated samples, configured to decode the ADS-B signals.

The dual-band filtering device 104, the digital filter 111 of the IFF path and the digital filter 121 of the ADS-B path together contribute to filtering the received signals, and in particular to complying with the rejection constraints defined by the DO-260, AIMS 03-1000 and ED73 standards. In particular:

the first dual-band analogue filtering level 104 is intended to provide part of the desired rejection of signals located outside the bands of interest, in particular those received between the IFF signal and the ADS-B signal, in order to avoid saturation of the ADC related to non-essential radiation, the second digital filtering level 111 and 121, matched to one or the other of the signals of interest, is configured such that the two filtering levels together make it possible to achieve the normative requirements.

The dual-band filtering device 104 thus contributes to the rejection of signals outside the IFF and ADS-B bands, but is not bound by the constraints defined by the standards, which is why its mask may be more relaxed, thus making it possible to implement such an analogue filter with reduced dimensions. However, the filter has to reject the adjacent bands to a sufficient extent, in particular the frequency band located between the IFF band and the ADS-B band, in order to avoid the phenomenon of saturation of the ADC due to non-essential radiation. One aim of the invention is to define such a filter.

SUMMARY OF THE INVENTION

To this end, the present invention describes a dual-band analogue filter configured to be passing for IFF signals received in a first frequency band centred on the 1030 MHz frequency and ADS-B signals received in a second frequency band centred on the 1090 MHz frequency, and to reject signals received outside the first frequency band and the second frequency band, in particular at least one frequency band between the first and the second frequency band.

The dual-band analogue filter according to the invention is implemented using multi-planar technology, and comprises a plurality of superimposed layers, including, in succession:

a first layer comprising an input port and an output port, a second layer comprising a ground plane having openings facing the input port and the output port, a third layer comprising N band-pass resonators, with N being greater than or equal to 1, a fourth layer comprising N band-stop resonators.

The elements of the layers are arranged such that:

the N band-pass resonators are connected in pairs by electromagnetic coupling, the first resonator of the N band-pass resonators is connected to the input port by electromagnetic coupling, the last resonator of the N band-pass resonators is connected to the output port by electromagnetic coupling, each band-pass resonator is connected to one of the band-stop resonators by electromagnetic coupling.

Advantageously, the dimensions of the band-pass resonators and of the band-stop resonators are chosen so that each band-pass/band-stop resonator pair forms a dual-band resonator configured to be passing in said first and second frequency band, and to reject signals received outside these two frequency bands, in particular in the frequency band between the first and the second frequency band.

According to one embodiment of a dual-band analogue filter according to the invention, where N is greater than or equal to 3, two non-consecutive band-pass resonators from among the N band-pass resonators are connected by electromagnetic coupling.

Advantageously, the spacing between the two non-consecutive band-pass resonators connected by electromagnetic coupling is chosen so as to form zeros in the impulse response of the filter that are positioned so as to increase the slope at the edges of the filter. In one embodiment, the two non-consecutive band-pass resonators connected by electromagnetic coupling are the first and the last band-pass resonator.

According to one embodiment, the dual-band analogue filter according to the invention is configured to reject signals received in the frequency band between the first and the second frequency band by at least 30 dB.

BRIEF DESCRIPTION OF THE DRAWINGS

The invention will be better understood and other features, details and advantages will become more clearly apparent on reading the following non-limiting description, and by virtue of the appended figures, which are given by way of example, among which.

Identical references may be used in different figures to denote identical or comparable elements.

DETAILED DESCRIPTION

Figure 1:
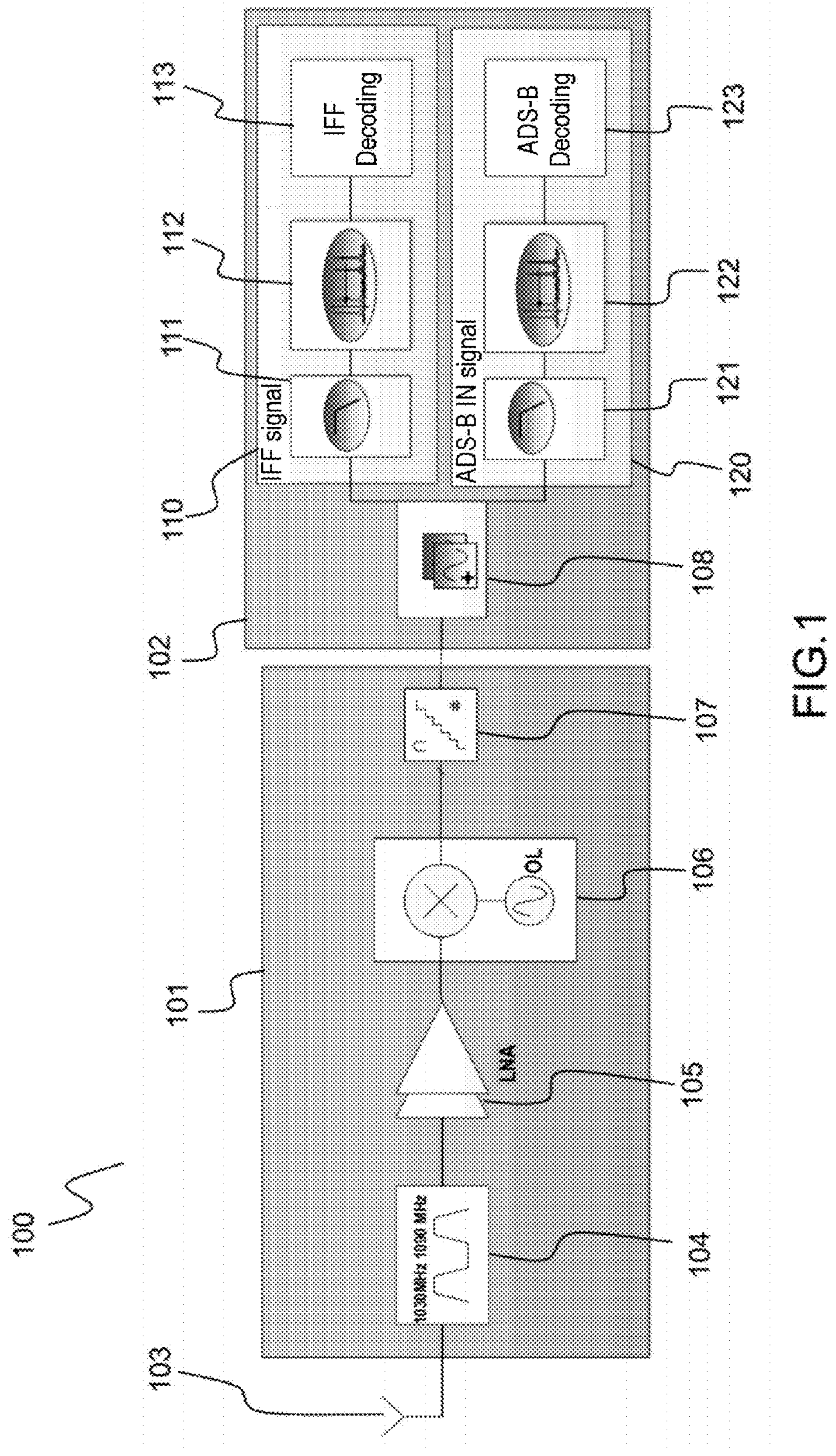
FIG. 1 schematically shows a hybrid radio reception chain allowing the simultaneous reception of IFF and ADS-B signals, as defined in patent application FR 2214616, FIG. 2 gives one example of a dual-band analogue filter mask that can be used to implement a dual-band IFF/ADS-B receiver.
Figure 2:
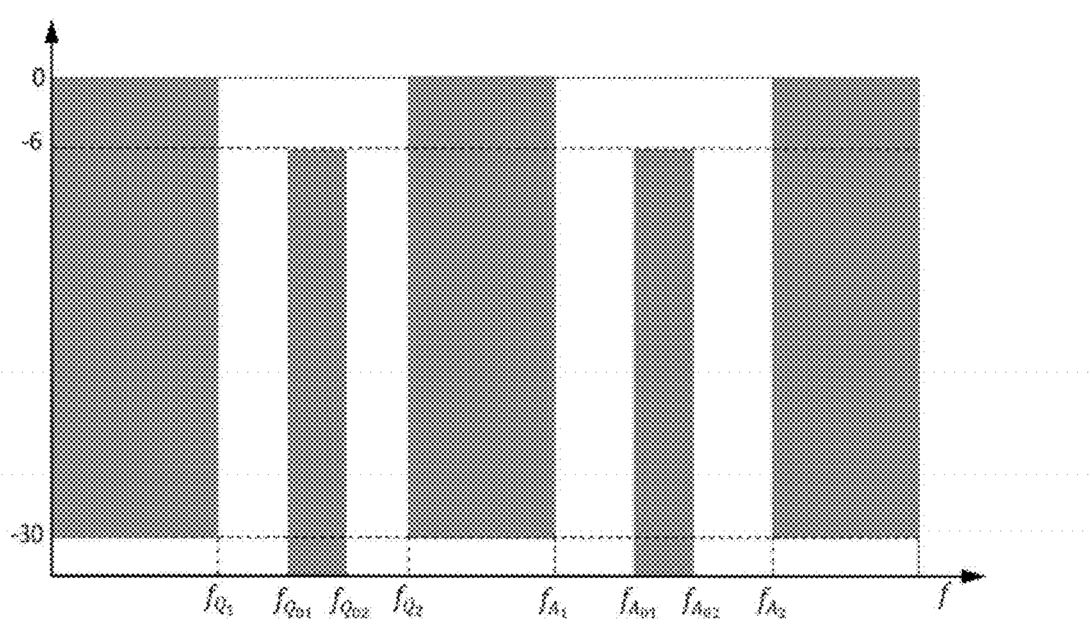

FIG. 2 gives one example of a dual-band analogue filter mask 103 that can be used to implement a dual-band IFF/ADS-B receiver, in which filtering is carried out jointly, in analogue and digital mode.

This mask is defined as passing between the frequencies $f_{Q1}$=1005 MHz and $f_{Q2}$=1055 MHz, which comprises the frequency band associated with the reception of IFF signals. The oscillation of signals in the subband $f_{Q01}$=1016 MHz to $f_{Q02}$=1044 MHz is limited to 6 dB, so as to minimize deformations of the IFF signal.

This filter is also defined as passing between the frequencies $f_{A1}$=1065 MHz and $f_{A2}$=1115 MHz, which comprises the frequency band associated with the reception of ADS-B signals. The oscillation of signals in the subband $f_{A01}$=1076 MHz to $f_{A02}$=1104 MHz is limited to 6 dB, so as to minimize deformations of the ADS-B signal.

Outside these two frequency bands, the rejection level of the filter is greater than 30 dB, in particular in the 1055 MHz-1063 MHz frequency band, in order to ensure sufficient rejection of signals transmitted in this band so as to avoid the phenomenon of saturating the ADC.

The mask of FIG. 2 is given only by way of illustration. It may be modified according to the desired performance, the efficiency of the digital filters implemented after the analogue filter, the performance of the analogue-to-digital converter, etc. However, the rejection values adopted in the example of FIG. 2 constitute a good compromise between rejection of unwanted signals, in particular in the band between the IFF signal and the ADS-B signal, and implementation compactness. The stability of the signal sought in the passbands of the filter of FIG. 2 also results from a good compromise between deformations caused to the spectrum of the payload signals and implementation complexity.

Many filter technologies may be used to implement analogue filtering functions. For example, volume technologies (cavity filters), planar technologies (microstrip filters, coplanar filters, multilayer filters, membrane filters) and SAW (Surface Acoustic Wave) or BAW (Bulk Acoustic Wave) filters are known.

The invention relates to a planar-technology filter, and more specifically to a multilayer filter. Such filters consist of a plurality of superimposed dielectric layers. They have the advantage of having an extremely small overall size, very good electrical performance, and of being easy and inexpensive to produce. The thesis by Y. Wu, E. Fourn, P. Besnier and C. Quendo, "*Direct synthesis of multiband bandpass filters with generalized frequency transformation methods*", IEEE transactions on microwave theory and techniques, vol. 69, no. 8, pp. 3820-3831, August 2021, describes the principle of multi-band planar filters.

Figure 3:
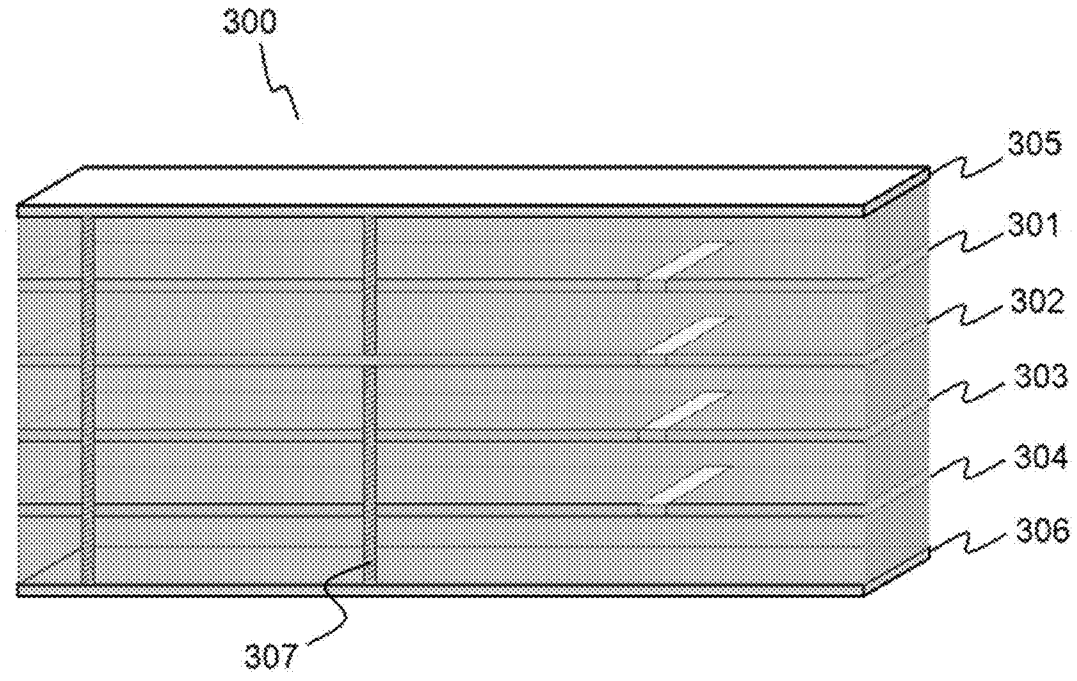
FIG. 3 shows the structure of a multilayer dual-band analogue filter according to one embodiment of the invention.

FIG. 3 shows the structure of a multilayer dual-band analogue filter according to one embodiment of the invention. This multilayer filter 300 has multiple superimposed layers 301 to 304, including, in succession:

- a first layer 301, comprising an input port and an output port for interfacing the filter with the other elements of the reception chain,
- a second layer 302, located directly below the first layer, comprising a ground plane having openings facing the input port and the output port,
- a third layer 303 comprising N band-pass resonators, with N being greater than 1. The band-pass resonators are connected in pairs by electromagnetic coupling, and
- a fourth layer 304 comprising N band-stop resonators. Each of the N band-stop resonators is connected to a single resonator from among the N band-pass resonators by electromagnetic coupling.

The purpose of the second layer 302 is to isolate the first layer 301, comprising the ports of the filter, from the layers 303 and 304, comprising the N band-pass resonators, so as to avoid the occurrence of interference generated by an unwanted coupling effect, for example between the input/output ports and the components of the filter, or between the components of the filter and external components, which interference would disturb the frequency response of the filter. The openings formed in the ground plane of the layer 302 have the effect of enabling the connection between the resonators of the layer 303 and the input/output ports by electromagnetic coupling.

In this embodiment of the invention, the first resonator of the N band-pass resonators of the layer 303 is connected to the input port by electromagnetic coupling, through an opening formed in the ground plane of the layer 302. Similarly, the last resonator of the N band-pass resonators of the layer 303 is connected to the output port by electromagnetic coupling, through an opening formed in the ground plane of the layer 302.

Advantageously, the filter may comprise a ground plane 305 located above the layer 301 comprising the access ports, and/or a ground plane 306 located below the layer 304 comprising the band-stop resonators. These ground planes, which cover the entire surface of the filter, make it possible to protect said filter against interference related to elements external to the filter. Advantageously, these ground planes may be connected to the ground plane 302 by a metallized hole passing through the layers (via) 307, such that the ground planes are exactly at the same potential.

The various components of the multilayer dual-band filter according to the invention are connected to one another by electromagnetic coupling. The expression "connected by electromagnetic coupling" is understood to mean that two elements not connected by conductor tracks are arranged close enough to bring about an exchange of energy between them. The value of the coupling coefficient depends directly on the distance between the elements and the length of the lines located facing one another. Depending on their respective arrangement, they may be coupled electrically or magnetically.

Connecting the resonators and the input/output ports by electromagnetic coupling makes it possible, inter alia, to simplify the production of the multilayer dual-band filter according to the invention, since it is not necessary to introduce metal tracks between the elements of one and the same layer, or metallized holes between the elements of different layers. Its complexity and its manufacturing cost are therefore reduced.

Figure 4:
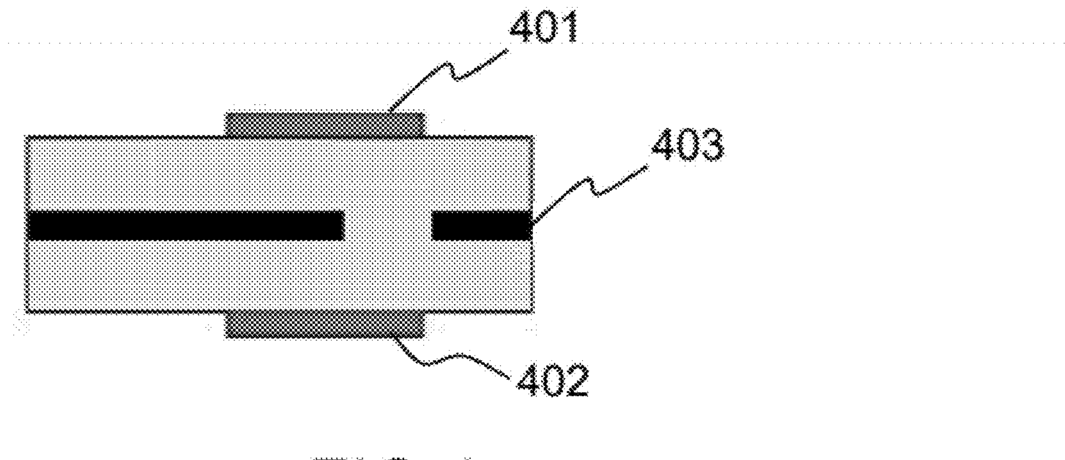
FIG. 4 shows the principle of coupling between elements located in various layers of a multilayer filter.

FIG. 4 shows, by way of illustration, the principle of coupling between elements located in various layers of a multilayer filter, in the case of two elements separated by a ground plane having openings. Reference 401 denotes a port of the layer 301, for example the input port of the filter. Reference 402 denotes for example the first resonator of the N band-pass resonators of the layer 303. Reference 403 denotes the ground plane of the layer 302. The port 401 and the resonator 402 are located flush one above the other, and the ground plane 403 is interrupted between these two elements, so as to enable the coupling effects. Coupling is also possible between components located in adjacent layers of a multilayer filter, in the absence of an interposed ground plane.

Figure 5:
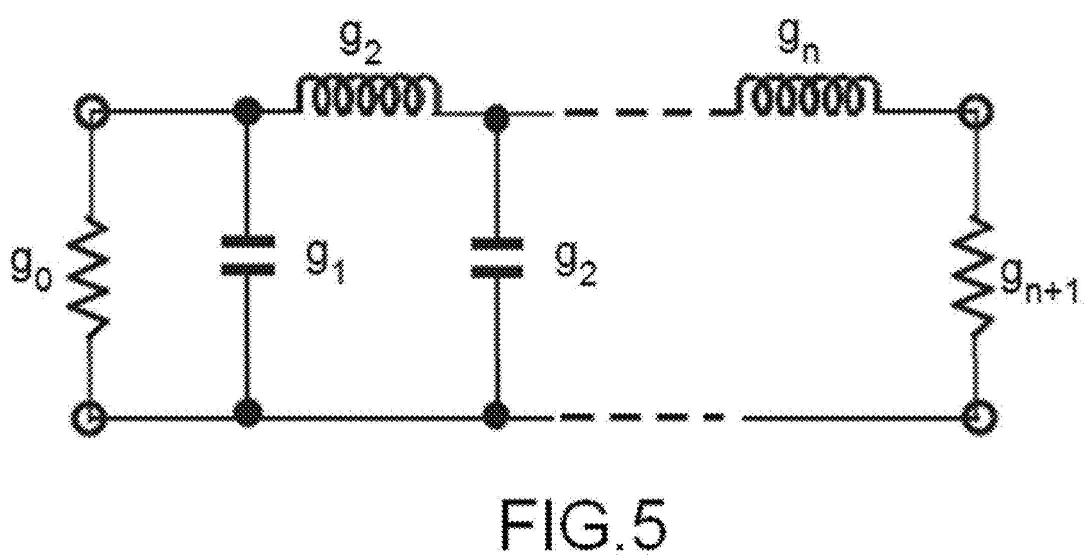
FIG. 5 shows the theoretical form of a ladder low-pass filter.

It is well known that a low-pass filter of order N may be represented in the form of series inductances and parallel capacitances, as illustrated in FIG. 5.

It is also known that this structure may be modified, so as to be represented in the form of parallel capacitances only, separated by admittance inverters, which make it possible to transform series coils into parallel capacitances.

Based on the filter mask given in FIG. 2, and as described in the above-cited thesis by Y. Wu, it is possible to determine the transfer function of a dual-band filter in the form:

$$\Omega = b_0\left(\frac{\omega}{\omega_0} - \frac{\omega_0}{\omega}\right) - \frac{1}{b_1\left(\frac{\omega}{\omega_1} - \frac{\omega_1}{\omega}\right)}$$

with:

$\Omega$ being the transfer function of the filter, $\omega_0$ and $b_0$ being the resonant frequency and the susceptance, or slope parameter, of a band-pass resonator equivalent to the first part of the equation, $\omega_1$ and $b_1$ being the resonant frequency and the susceptance, or slope parameter, of a band-stop resonator equivalent to the second part of the equation.

Figure 6A:
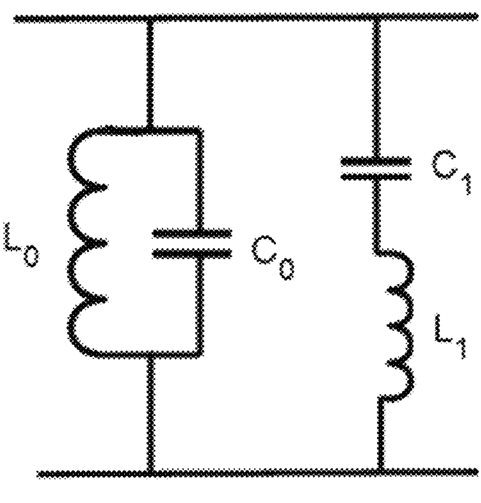
FIG. 6*a* illustrates the equivalent structure of a dual-band resonator.

This dual-band resonator consists of a band-pass resonator, equivalent to an inductance and a capacitance connected in parallel, positioned in parallel with a band-stop resonator, equivalent to an inductance and a capacitance connected in series. FIG. 6*a* illustrates the equivalent structure of a dual-band resonator, consisting of a band-pass resonator formed by the capacitance $C_0$ and the inductance $L_0$, connected in parallel with a band-stop resonator formed by the capacitance $C_1$ and the inductance $L_1$.

The values of the capacitances and inductances $C_0$, $C_1$, $L_0$ and $L_1$ may be obtained using the following formulas:

$$L_0 = \frac{1}{b_0 C^{LP} \omega_0}$$

$$C_0 = \frac{1}{L_0 \omega_0^2}$$

$$L_1 = \frac{1}{b_1 C^{LP} \omega_1}$$

$$C_1 = \frac{1}{L_1 \omega_1^2}$$

where $C^{LP}$ is the value of the capacitance of the original low-pass prototype obtained using the Chebyshev or Butterworth shape coefficients associated with the expected response.

Figure 6B:
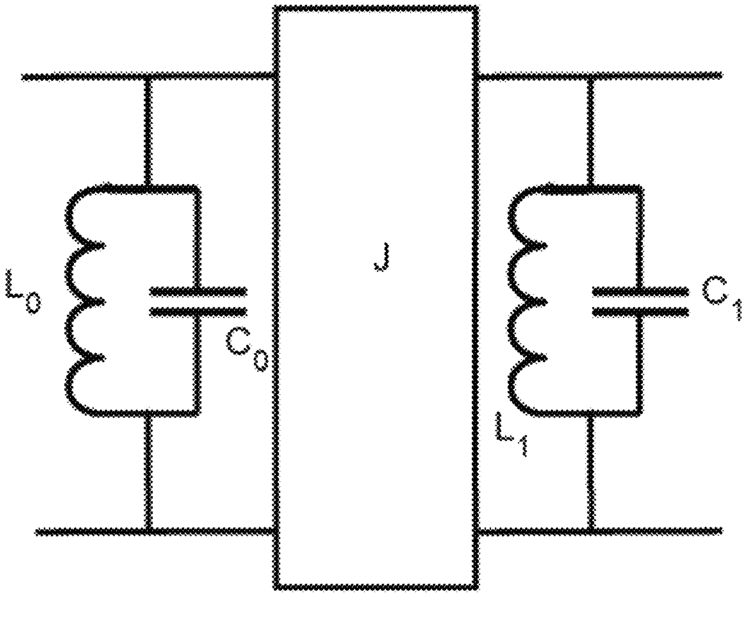
FIG. 6*b* shows an assembly equivalent to that of FIG. 6*a*.

Furthermore, the dual-band resonator of FIG. 6*a* may be transformed into that of FIG. 6*b* so as to comprise only LC components in parallel, by introducing an admittance inverter of impedance J, with:

$$J = \sqrt{\frac{\beta_0 \beta_1}{b_0 b_1}}$$

with $\beta_i = \omega_i C_i$.

Figure 7:
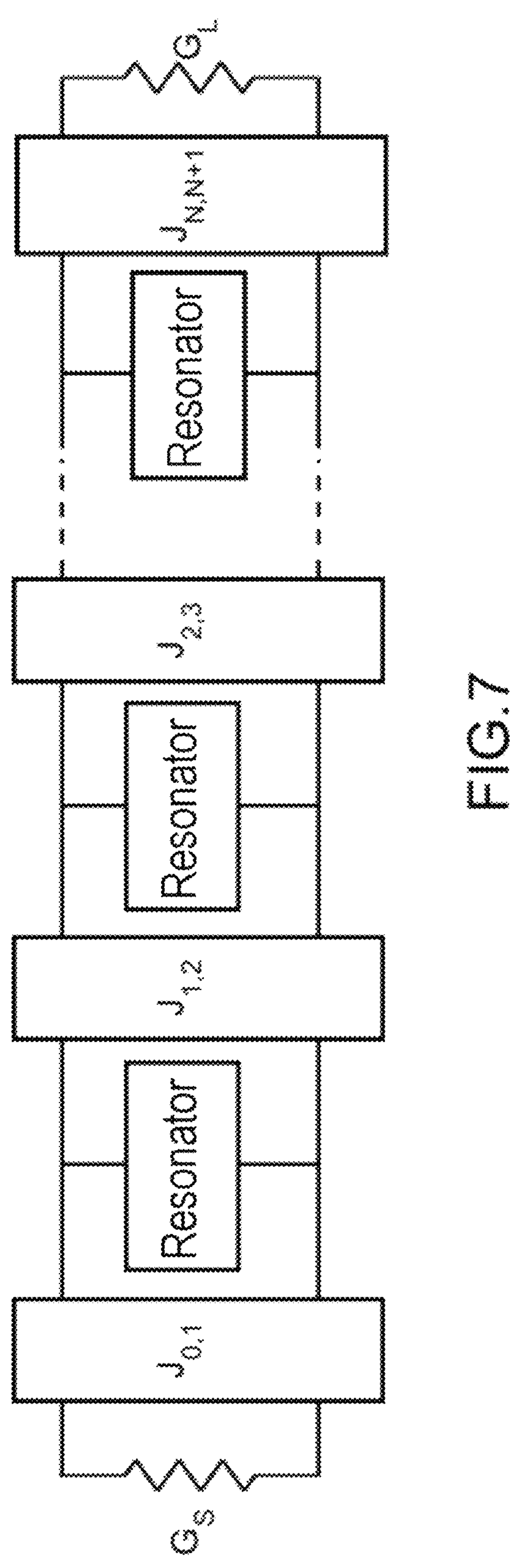
FIG. 7 shows the structure of a dual-band filter of order N.

Adopting the ladder low-pass filter structure of FIG. 5, modified so as to have only parallel capacitances separated by admittance inverters, and using the dual-band resonator of FIG. 6*b* instead of the parallel capacitances gives the structure of a dual-band filter of order N as shown in FIG. 7, with $G_S$ being the impedance of the source and $G_L$ being the impedance of the load.

The impedances of the admittance inverters are, respectively:

$$J_{0,1} = \sqrt{\frac{G_S \beta_0}{b_0 g_0 g_1}}$$

$$J_{i,i+1} = \frac{1}{b_0}\sqrt{\frac{\beta_0^2}{g_i g_{i+1}}}$$

$$J_{N,N+1} = \sqrt{\frac{G_L \beta_0}{b_0 g_N g_{N^\circ 1}}}$$

where the coefficients $g_i$ are the Chebyshev or Butterworth shape coefficients associated with the expected response.

These steps make it possible to express a dual-band filter of order N according to the invention through a succession of parallel dual-band filters separated by admittance inverters, each dual-band filter itself being able to be seen as a band-pass filter positioned in parallel with an admittance inverter and a band-stop filter, the band-pass filter and the band-stop resonator being represented in the form of a parallel LC circuit.

In microstrip technology, a parallel LC filter may be implemented in the form of a resonator, that is to say an open line of length $\lambda/4$ and of impedance Z. The parameter $\lambda$ is the wavelength in the substrate, which may be derived directly from the resonant frequency $\omega_0$ of the band-pass filter, or $\omega_1$ of the band-stop filter. The impedance Z of a lossless transmission line is approximately $\sqrt{L/C}$. This impedance makes it possible to calculate the width of the transmission line, also on the basis of the type of substrate. These parameters make it possible to determine the dimensions of open lines used to implement the resonators of the dual-band filter according to the invention.

One way to implement an admittance inverter is to replace it with a quarter-wave line. It is also possible to replace it with a coupling circuit. The coupling coefficients are related to the impedances of the admittance inverters.

The invention proposes to implement a dual-band filter that is passing for the frequency bands associated with IFF and ADS-B signals (that is to say passbands centred around the 1030 MHz and 1090 MHz frequencies) while at the same time rejecting other frequencies, in particular intermediate frequencies to these two bands. Referring to the mask of FIG. 2, this means that the dual-band filter is passing at least in the frequency bands ranging from $f_{Q01}$ to $f_{Q02}$ and from $f_{A01}$ to $f_{A02}$, and that it rejects signals whose frequency is less than $f_Q$, greater than $f_A$, and between $f_{Q2}$ and $f_{A1}$ by at least 30 dB.

The implementation is achieved by way of a multilayer circuit consisting of resonators equivalent to parallel LC circuits connected by electromagnetic coupling, thereby making it possible both to dispense with transmission lines and thus simplify the design of the filter, and to implement the admittance inverters needed to implement the dual-band filter according to the invention.

Figure 8:
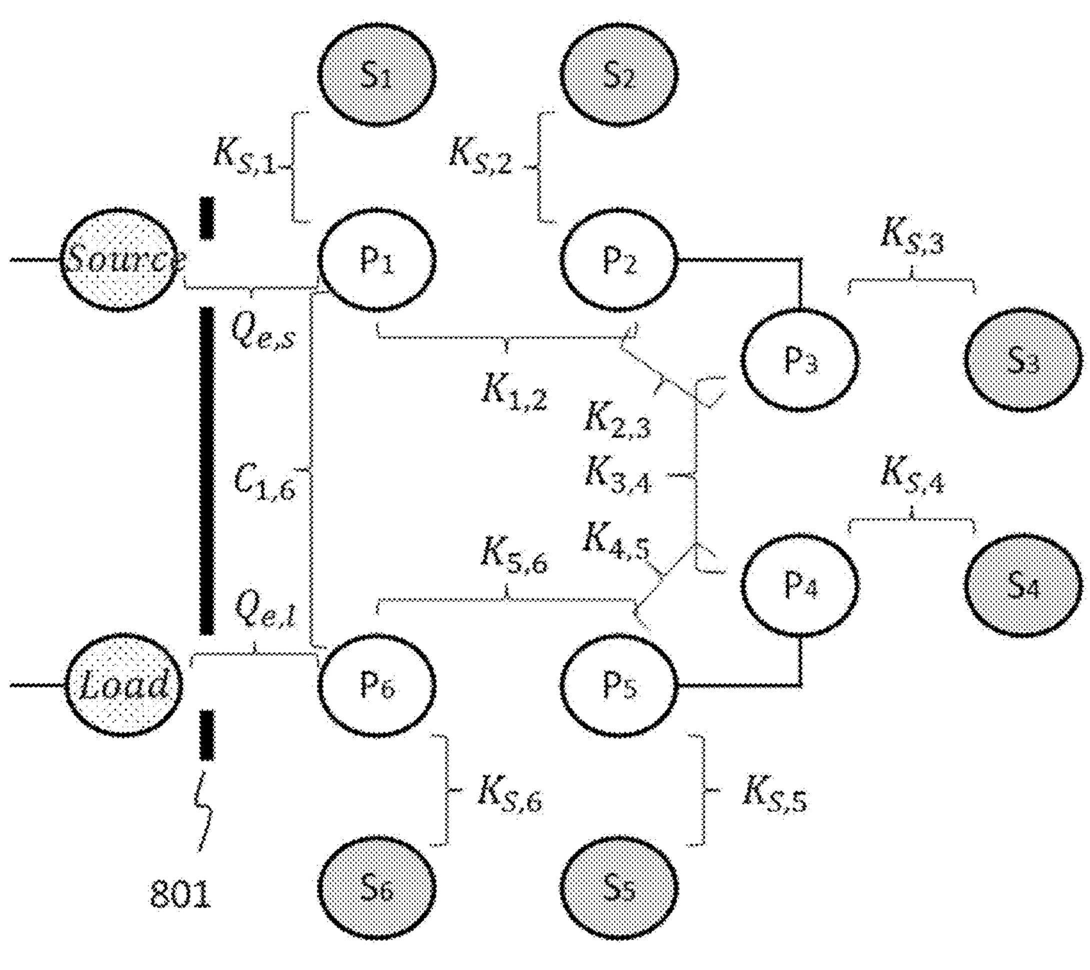
FIG. 8 is a coupling diagram of the multilayer dual-band filter of order 6 according to the embodiment of the invention.

FIG. 8 is a coupling diagram of a multilayer dual-band filter of order N=6 according to one embodiment of the invention. The order of the filter is the result of a compromise between the performance of the filter (steepness of the slopes of the spectral mask, rejection level, in-band oscillation), on the one hand, and the footprint of the filter, on the other hand. The invention is applicable to any value of N greater than or equal to 1.

It is possible to see an input port (In) and an output port (Out), connected to an input (Source) and an output (Load) of the filter, respectively. The filter is implemented here in the form of N=6 dual-band resonators each comprising a band-pass resonator $P_i$ and a band-stop resonator $S_i$. The two resonators are associated by coupling, with a coefficient $K_{s,i}$, so as to replace the admittance inverter J of FIG. 6*b*. In practice, this gives $K_{s,i}=J$. Each band-pass resonator is connected to another band-pass resonator by coupling, with a coupling coefficient $K_{i,i+1}$, so as to replace the admittance inverters of impedance $J_{i,i+1}$, with $i\in(1,N)$, of FIG. 7. In practice, this gives $K_{i,i+1}=J_{i,i+1}$.

It is also possible to see an input port (Source) and an output port (Load), connected to the first and to the last of the N band-pass resonators, respectively, by electromagnetic coupling. The connection is made by coupling, respectively with coefficients $Q_{e,s}$ and $Q_{e,l}$, so as to implement the admittance inverters $J_{0,1}$ and $J_{N,N+1}$ of FIG. 7. The coupling between the input/output ports and the band-pass resonators takes place through the openings of the ground plane 801, and is adjusted on the basis of the desired coupling coefficients. In practice, this gives $$Q_{e,s}=\left(\frac{1}{J_{0,1}}\right)^2 \text{ and } Q_{e,l}=\left(\frac{1}{J_{N,N+1}}\right)^2.$$

The multilayer structure of the dual-band filter according to the invention makes it possible to interface all of the resonators through coupling effects while avoiding parasitic coupling, which would be difficult to achieve on a single-layer filter. It also makes it possible to interface the position of the input/output ports freely with the resonators, by virtue of the ground plane isolating the layer comprising the band-pass resonators from the input/output ports. Another advantage is that of being able to adjust the type of substrate of each layer, so as to adapt the dimensions of the lines of the various layers so that they have widths close to one another, thereby making it possible to simplify the design of the filter and simplifying the coupling between resonators of different layers.

Figure 9:
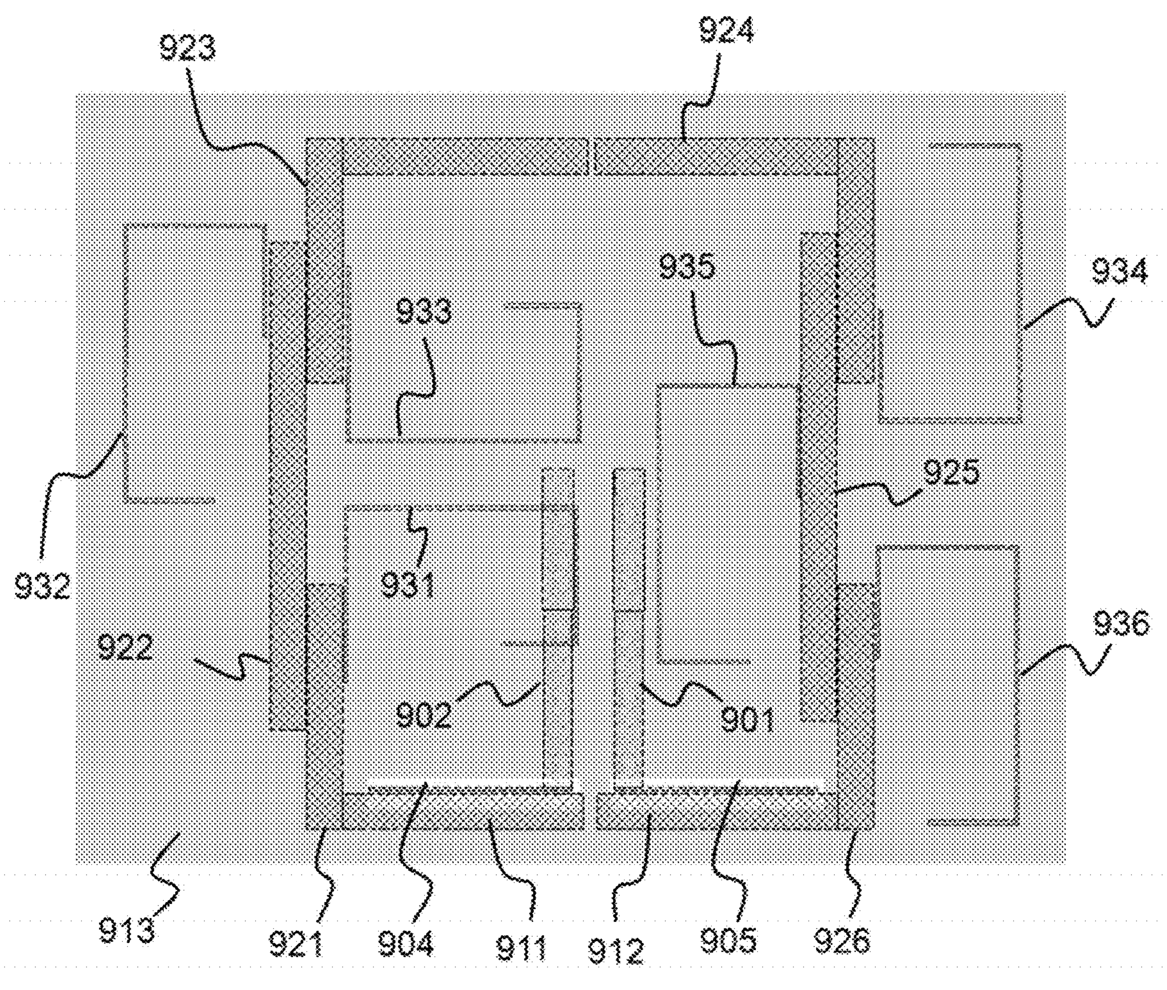
FIG. 9 shows a plan view of a multilayer dual-band filter of order N=6 according to one embodiment of the invention, in which the various layers are shown superimposed.

FIG. 9 shows a plan view of a multilayer dual-band filter of order N=6 according to one embodiment of the invention, given by way of illustration only, in which the various layers are shown superimposed. It is possible to see an input port 901 and an output port 902, and a ground plane 913 covering the entire surface of the filter. The ground plane 913 has two openings 911 and 912, positioned between metal tracks 904 and 905 extending the input and output ports on the layer 301, and band-pass resonators 921 and 926 positioned on the layer 303. The input ports and the band-pass resonators are thus connected in pairs through coupling effects. The metal tracks 904 and 905 and the ground plane 913 make it possible to position the input/output ports 901 and 902 freely over the entire surface of the filter.

The filter also comprises N=6 band-pass resonators 921 to 926, connected in pairs through an electrical or magnetic coupling effect. In the example, the resonators 921 and 922 are connected by magnetic coupling, while the resonators 923 and 924 are connected by electrical coupling. The N=6 resonators thus form a loop between the input port and the output port. The dimensions of the resonators are obtained theoretically from the filter mask, as described above. However, they may be adjusted to the margin to compensate for any imperfections when producing the circuit or any unwanted interference. The shapes and positions thereof are chosen so as to limit the overall size of the filter while at the same time complying with inter-element coupling constraints.

The filter also comprises N=6 band-stop resonators 931 to 936. Each band-stop resonator is positioned so as to be connected to a single band-pass resonator 921 to 926 by electrical or magnetic coupling. In the example of FIG. 9, the band-stop resonator 931 is connected to the band-pass resonator 921, etc. by magnetic coupling. The dimensions of the band-stop resonators are obtained theoretically from the filter mask, as described above, and may be adjusted to the margin. The shapes and positions thereof are chosen so as to limit the overall size of the filter while at the same time complying with inter-element coupling constraints, in particular the absence of significant coupling between band-stop resonators.

In the example of FIG. 9, the resonators are open-end resonators. However, the invention is applicable to any type of resonator, such as for example open-stub resonators, ring resonators, etc.

Advantageously, in one embodiment of a dual-band IFF/ADS-B filter according to the invention, two of the non-consecutive band-pass resonators are connected through a coupling effect. In the example of FIG. 9, these are the band-pass resonator 921 and the band-pass resonator 926, the ends of which are brought together such that they are connected by electrical coupling, with a coupling coefficient corresponding to $C_{1,6}$ in FIG. 8. Indeed, coupling non-consecutive band-pass resonators of the series of band-pass resonators makes it possible to create zeros in the frequency response of the dual-band filter.

The zeros of a filter constitute the frequencies for which the theoretical attenuation of the filter is infinite. The multilayer dual-band filter according to the invention uses the coupling between two non-consecutive band-pass resonators of the layer 303 to increase the slope of the frequency response at the edges of the filter. The other non-consecutive resonators of the filter are arranged far enough apart so as not to generate significant coupling effects.

In the example of FIG. 9, the resonator 921 and the resonator 926, which constitute the first and the last of the series of band-pass resonators, are connected by electromagnetic coupling. However, other pairs of non-consecutive band-pass resonators make it possible to produce equivalent results.

Figure 10:
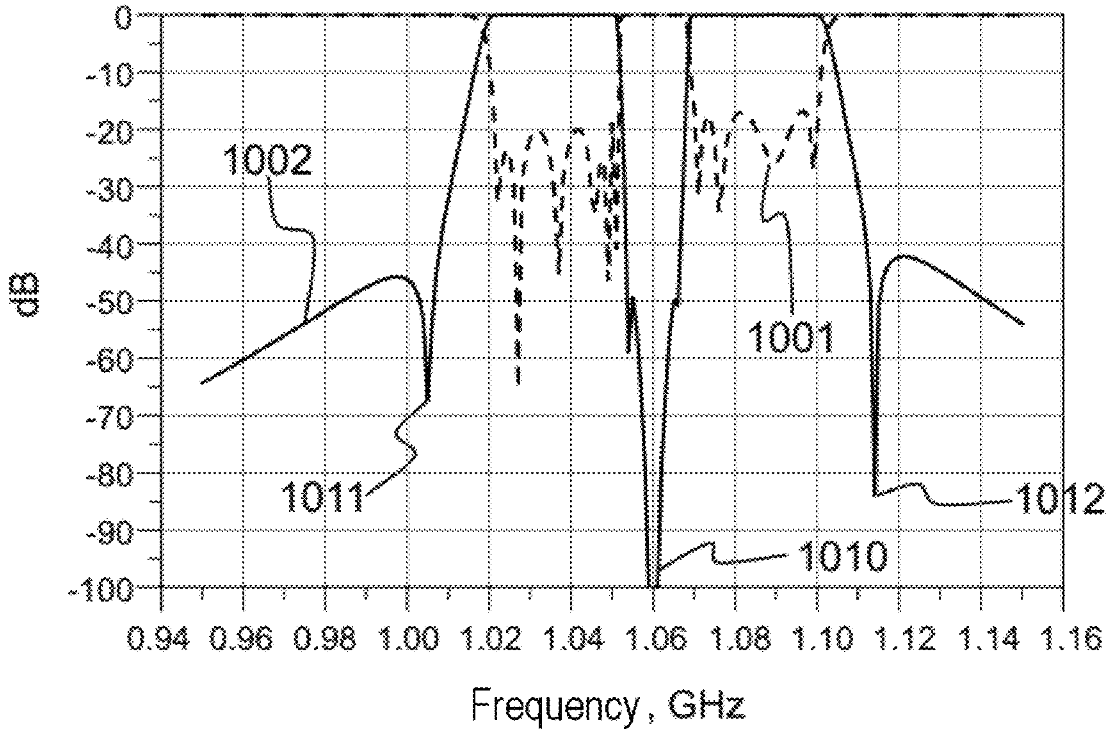
FIG. 10 shows the theoretical frequency response of the multilayer dual-band filter according to the embodiment of the invention shown in FIG. 9.

FIG. 10 shows the theoretical frequency response of the multilayer dual-band filter according to the embodiment of the invention shown in FIG. 9. The curve 1001 represents the reflection coefficient of the filter, or S11, as a function of frequency. The curve 1002 represents the attenuation of the filter, or S21, as a function of frequency.

It may be seen that this filter conforms to the spectral mask shown in FIG. 2, that is to say that it exhibits rejection greater than 30 dB for frequencies less than 1005 MHz (in practice those less than 1100 MHz), for frequencies greater than 1115 MHz, and in the intermediate 1055 MHz-1065 MHz frequency band.

In addition to the zeros related to the response of the dual-band filter, such as the zero 1010 close to the 1060 MHz frequency, the filter has two zeros 711 and 712 located at the edges of the passband of the filter, related to the coupling between two non-consecutive band-pass resonators P1 and P2, and which have the effect of making the slope of the filter steeper, thus making it possible to quickly reach high rejection levels outside the two IFF and ADS-B operating bands. These zeros are symmetrical about the central band of the filter (that is to say 1060 MHz). In practice, the distance between the non-consecutive band-pass resonators coupled so as to generate these zeros is adjusted empirically, in simulations, so as to obtain the optimum position of the zeros.

The filter according to the invention may therefore be positioned at the reception head of a device configured to process IFF signals and ADS-B signals simultaneously. It makes it possible to significantly reject signals transmitted in adjacent frequencies, in particular those transmitted in the frequency band located between IFF signals (1030 MHz) and ADS-B signals (1090 MHz). It may therefore be used to implement a common IFF/ADS-B reception chain that satisfies strict rejection requirements, in particular the DO-260, AIMS 03-1000 and ED73 standards.

The filter according to the invention exhibits very good rejection of out-of-band signals, a very good response in the bands of interest and good selectivity, with a small volume, and does so by virtue of the combination of the following techniques: a multilayer structure, making it possible to design filters of reduced size and to easily arrange elements that are connected through coupling effects, connecting the components (ports and resonators) through coupling effects, making it possible to limit the components of the filter to a strict minimum and to eliminate all of the metal elements (tracks, vias) needed to connect the components to one another, and thus to reduce the volume and the consumption of the filter, adding specific couplings between resonators, making it possible to position zeros in the frequency response of the filter so as to increase the frequency selectivity thereof.

The invention claimed is:

1. A dual-band analogue filter configured to be passing for IFF signals received in a first frequency band ($f_{Q01}$-$f_{Q02}$) centered on the 1030 MHz frequency and ADS-B signals received in a second frequency band ($f_{A01}$-$f_{A02}$) centered on the 1090 MHz frequency, and to reject signals received outside the first frequency band and the second frequency band, in particular at least one frequency band ($f_{Q2}$-$f_{A1}$) between the first frequency band and the second frequency band, said dual-band analogue filter being implemented using multi-planar technology, and comprising a plurality of superimposed layers, including, in succession:

a first layer comprising an input port and an output port, a second layer comprising a ground plane having openings facing the input port and the output port, a third layer comprising N band-pass resonators, with N being greater than or equal to 1, and a fourth layer comprising N band-stop resonators;

wherein the elements of said layers are arranged such that:

the N band-pass resonators are connected in pairs by electromagnetic coupling ($K_{1,2}$, $K_{2,3}$, $K_{3,4}$, $K_{4,5}$, $K_{5,6}$), a first resonator of the N band-pass resonators is connected to the input port by electromagnetic coupling ($Q_{e,s}$), a last resonator of the N band-pass resonators is connected to the output port by electromagnetic coupling ($Q_{e,1}$), and each band-pass resonator is connected to one of said band-stop resonators by electromagnetic coupling ($K_{S,1}$, $K_{S,2}$, $K_{S,3}$, $K_{S,4}$, $K_{S,5}$, $K_{S,6}$).

2. The dual-band analogue filter according to claim 1, wherein the dimensions of the band-pass resonators and of the band-stop resonators are chosen so that each band-pass/band-stop resonator pair forms a dual-band resonator configured to be passing in said first frequency band and said second frequency band, and to reject signals received outside said first and second frequency bands, in particular in a frequency band between the first frequency band and the second frequency band.

3. The dual-band analogue filter according to claim 1, wherein N is greater than or equal to 3, and wherein two non-consecutive band-pass resonators from among the N band-pass resonators are connected by electromagnetic coupling ($C_{1,6}$).

4. The dual-band analogue filter according to claim 3, wherein the spacing between the two non-consecutive band-pass resonators connected by electromagnetic coupling is chosen so as to form zeros in the impulse response of the dual-band analogue filter that are positioned so as to increase the slope at the edges of the dual-band analogue filter.

5. The dual-band analogue filter according to claim 3, wherein the two non-consecutive band-pass resonators connected by electromagnetic coupling are a first band-pass resonator and a last band-pass resonator.

6. The dual-band analogue filter according to claim 1, configured to reject signals received in said at least one frequency band ($f_{Q2}$-$f_{A1}$) between the first frequency band and the second frequency band by at least 30 dB.

* * * * *